(12) United States Patent
Netsu

(10) Patent No.: US 10,477,057 B2
(45) Date of Patent: Nov. 12, 2019

(54) SCANNER AND SCANNER DATA GENERATING METHOD

(71) Applicant: SEIKO EPSON CORPORATION, Tokyo (JP)

(72) Inventor: Takahiro Netsu, Nagano (JP)

(73) Assignee: Seiko Corporation, Tokyo (JP)

( * ) Notice: Subject to any disclaimer, the term of this patent is extended or adjusted under 35 U.S.C. 154(b) by 0 days.

(21) Appl. No.: 15/976,941

(22) Filed: May 11, 2018

(65) Prior Publication Data

US 2018/0352106 A1 Dec. 6, 2018

(30) Foreign Application Priority Data

May 30, 2017 (JP) .................. 2017-106278

(51) Int. Cl.
| | | |
|---|---|---|
| H04N 1/024 | (2006.01) | |
| H04N 1/00 | (2006.01) | |
| H04N 1/06 | (2006.01) | |
| H04N 1/031 | (2006.01) | |

(52) U.S. Cl.
CPC ....... *H04N 1/02409* (2013.01); *H04N 1/0066* (2013.01); *H04N 1/00997* (2013.01); *H04N 1/0315* (2013.01); *H04N 1/0621* (2013.01)

(58) Field of Classification Search
None
See application file for complete search history.

(56) References Cited

U.S. PATENT DOCUMENTS

| | | | | | |
|---|---|---|---|---|---|
| 4,641,035 | A * | 2/1987 | Suzuki | .................... | H01L 21/30 250/548 |
| 4,832,429 | A * | 5/1989 | Nagler | ................ | G02B 26/126 359/216.1 |
| 5,075,770 | A * | 12/1991 | Smyth | ................ | H04N 1/19505 348/272 |
| 5,121,137 | A * | 6/1992 | Taki | ........................ | H04N 1/502 347/232 |
| 5,504,613 | A * | 4/1996 | Itabashi | ............... | G02B 26/126 359/208.1 |
| 5,801,462 | A * | 9/1998 | Yagoto | ................... | H02K 41/03 310/12.04 |
| 6,268,600 | B1 * | 7/2001 | Nakamura | ........... | G02B 6/0001 250/216 |
| 6,323,959 | B1 * | 11/2001 | Toyama | ................. | H04N 1/482 358/518 |
| 7,859,727 | B2 * | 12/2010 | Fang | ........................ | H04N 1/03 358/450 |
| 8,345,325 | B2 | 1/2013 | Schmidt et al. | | |
| 9,436,010 | B2 * | 9/2016 | Komatsu | ........... | G02B 17/0848 |
| 2002/0050562 | A1 * | 5/2002 | Yoshikawa | .......... | G02B 26/126 250/234 |
| 2003/0039486 | A1 * | 2/2003 | Bannai | ................... | G03G 15/04 399/211 |

(Continued)

FOREIGN PATENT DOCUMENTS

| | | |
|---|---|---|
| EP | 2091223 A1 | 8/2009 |
| JP | 4864021 B2 | 1/2012 |
| JP | 2016-205171 A | 12/2016 |

*Primary Examiner* — Anh-Vinh T Nguyen

(57) ABSTRACT

A scanner has a first mirror having a plurality of concavities configured to reflect light from a document; and a sensor configured to detect light reflected by the concavity; the concavity having an optical characteristic that differs according to position.

6 Claims, 6 Drawing Sheets

(56) References Cited

U.S. PATENT DOCUMENTS

| | | | |
|---|---|---|---|
| 2003/0142865 A1* | 7/2003 | Hirota | H04N 1/58 382/167 |
| 2003/0164995 A1* | 9/2003 | Hsu | H04N 1/03 358/509 |
| 2004/0252178 A1* | 12/2004 | Yoshikawa | G02B 26/123 347/233 |
| 2005/0088512 A1* | 4/2005 | Nomura | B41J 2/471 347/260 |
| 2005/0098716 A1* | 5/2005 | Yoshikawa | G02B 26/126 250/235 |
| 2005/0206928 A1* | 9/2005 | Itagaki | H04N 1/40006 358/1.9 |
| 2006/0028533 A1* | 2/2006 | Nakajima | G03G 15/04036 347/233 |
| 2009/0009857 A1* | 1/2009 | Yamada | G02B 27/46 359/352 |
| 2010/0139989 A1* | 6/2010 | Atwater | G01G 19/4144 177/245 |
| 2014/0049831 A1* | 2/2014 | Takeda | G02B 27/0172 359/630 |
| 2016/0303864 A1 | 10/2016 | Ando et al. | |
| 2017/0205609 A1* | 7/2017 | Fukuyama | G02B 21/0076 |
| 2017/0245962 A1* | 8/2017 | Skamser | A61C 7/20 |
| 2017/0334212 A1 | 11/2017 | Ando et al. | |
| 2018/0352106 A1* | 12/2018 | Netsu | H04N 1/02409 |
| 2018/0359384 A1* | 12/2018 | Nishida | H04N 1/04 |
| 2019/0045075 A1* | 2/2019 | Murase | H04N 1/19531 |
| 2019/0230241 A1* | 7/2019 | Ouchi | G02B 5/10 |

\* cited by examiner

SCANNER AND SCANNER DATA GENERATING METHOD

BACKGROUND

1. Technical Field

The present invention relates to a scanner and method of generating scanning data.

2. Related Art

Technology for scanning documents using multiple line sensors, and combining the output detected by each line sensor to generate scanner data is known from the literature. For example, JP-A-2013-131794 describes a configuration having multiple optical systems aligned in a main scanning direction disposed in two rows in a sub-scanning direction, focusing by different optical systems on different line sensors, and merging the read results to generate scanning data.

The specifications of parts configuring the product are not clear in the technology cited above.

SUMMARY

An objective of the present invention is to provide a more desirable product.

To achieve the foregoing objective, a scanner according to the invention includes a first mirror having a plurality of concavities configured to reflect light from a document; and a sensor configured to detect light reflected by the concavity; an optical characteristic of the concavity differing according to position.

This configuration enables adjusting image quality at specific locations on the path of light reflected by the concavities by adjusting an optical characteristic of the concavity at specific positions.

In another aspect of the invention, the optical characteristic may be a spatial frequency characteristic to displacement of the document from a reference position.

This configuration enables adjusting image quality at specific locations on the path of light reflected by the concavities by adjusting the spatial frequency characteristic of the concavity at specific positions.

In another aspect of the invention, the distribution of the spatial frequency characteristic on an edge side of the concavity shifts to a document separation side more than the distribution of the spatial frequency characteristic on the center side of the concavity.

This configuration enables suppressing, at the edge side of the concavity, a drop in image quality due to separation of the document from the reference position.

In another aspect of the invention, the maximum of the spatial frequency characteristic on an edge side of the concavity is less than the maximum of the spatial frequency characteristic on a center side of the concavity.

In this configuration, the spatial frequency characteristic is relatively higher at the center side of the concavity than at the edge side.

In another aspect of the invention, the optical characteristic is a focal length.

This configuration enables adjusting image quality at specific locations on the path of light reflected by the concavities by adjusting the focal length of the concavity at specific positions.

In another aspect of the invention, the focal length at an edge side of the concavity is longer than the focal length at a center side of the concavity.

This configuration enables suppressing, at the edge side of the concavity, a drop in image quality due to separation of the document from the reference position.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below in the following order: (1) scanner configuration, (2) optical system configuration, (2-1) spatial frequency characteristics, (3) scanning process, (4) other embodiments.

(1) Scanner Configuration

Figure 1:
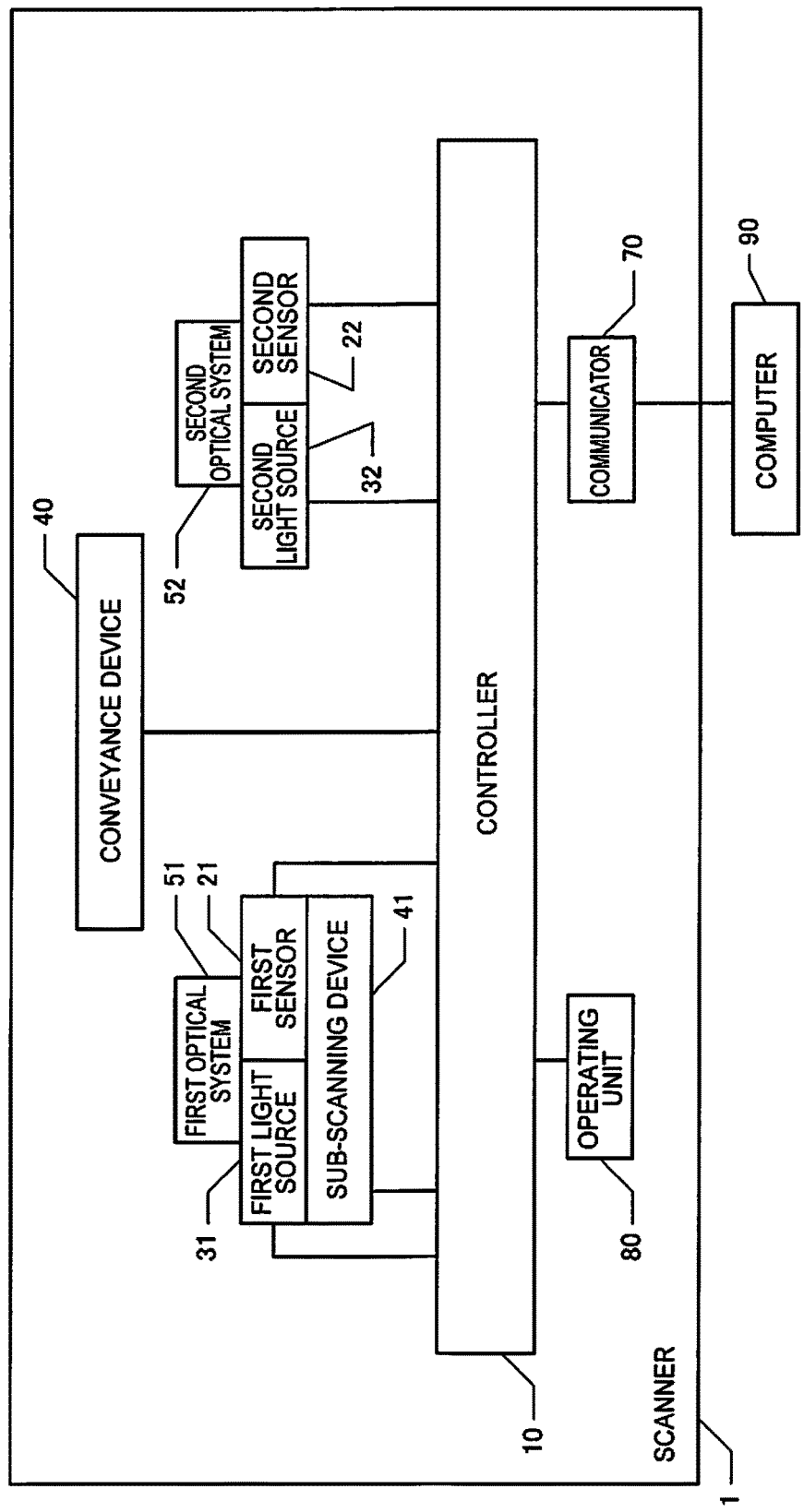
FIG. 1 is a block diagram of a scanner.

FIG. 1 is a block diagram of a scanner 1 according to this embodiment of the invention. The scanner 1 includes a controller 10, conveyance device 40, communicator 70, operating unit 80, computer 90, and a 2-channel reading unit (including light sources, sensors, and optical units). The controller 10 includes a recording medium not shown, and a processor that reads and executes a program from the recording medium. The processor may be a dedicated circuit device such as an ASIC embodied by circuits executing a specific process, or a CPU and ASIC that work together.

The controller 10 controls parts of the scanner 1, and generates scanning data based on output from a reading unit. An operating unit 80 includes an output unit that provides information to the user, and an input unit for receiving input from the user. The controller 10 controls the operating unit 80 to display on the output unit information for selecting scanning conditions and instructing scanning, for example. Based on output from the output unit, the user can select scanning conditions and input start-scanning commands.

When a start-scanning command is input, the controller 10 controls parts of the scanner 1 to execute the operations for scanning a document (such as conveying the document). When scanning data is output from the reading unit by this operation, the controller 10 generates scanning data.

The communicator 70 is a device for communicating with an external device (an external computer 90 in this example), and the controller 10 can send desired information to the computer 90 and receive instructions and information from the computer 90.

In this embodiment of the invention, when the controller 10 produces scanning data, the controller 10 sends the scanning data through the communicator 70 to the computer 90. The scanning data may obviously be used in many ways, and may be stored on a recording medium not shown of the scanner 1, stored on a removable recording medium, or sent through the communicator 70 to a device other than the computer 90.

The scanner 1 according to this embodiment has both an automatic document feeder (ADF) not shown, and a scanning platen, and documents are scanned at the scanning position regardless of which is used. The scanner 1 according to this embodiment has a first reading unit and a second reading unit. The first reading unit can scan both moving documents (the front or first side) that are conveyed by the ADF, and stationary documents that are placed by the user directly on the scanning platen. The second reading unit can scan moving documents (the back or second side, the opposite side as the front), and cannot scan stationary documents.

The first reading unit includes, as shown in FIG. 1, a first sensor 21, a first light source 31, a sub-scanning device 41, and a first optical system 51. The sub-scanning device 41 is a device for moving the first sensor 21, first light source 31, and first optical system 51 bidirectionally in the sub-scanning direction.

The second reading unit includes, as shown in FIG. 1, a second sensor 22, a second light source 32, and a second optical system 52, and does not have a device equivalent to the sub-scanning device 41. More specifically, the second sensor 22, second light source 32, and second optical system 52 are stationary inside the scanner 1. Light from the second light source 32 is emitted to a specific position in the conveyance path of the moving document, and light from the moving document passes through the second optical system 52 and is sensed by the second sensor 22 to image the document.

The first sensor 21 and second sensor 22 comprise multiple sensor chips. Each sensor is therefore a sensor group. Each sensor chip forms a line sensor, which is a sensor extending in one direction, and comprises numerous photoelectric conversion elements arrayed in the one direction. In this embodiment, each sensor chip has photoelectric conversion elements arranged in three rows, and a red (R), green (G), and blue (B) color filter is respectively disposed to the photoelectric conversion elements in each row. In this embodiment of the invention, the direction in which the rows of photoelectric conversion elements extend is perpendicular to the sub-scanning direction (the conveyance direction of a moving document). The direction in which the photoelectric conversion elements are arrayed is referred to as the main scanning direction.

The multiple sensor chips of the first sensor 21 are disposed at a specific interval in the main scanning direction.

The multiple sensor chips of the second sensor 22 are disposed adjacently in the main scanning direction, and the interval between adjacent photoelectric conversion elements in different sensor chips is the same as the interval between photoelectric conversion elements in a sensor chip at a different position. In the second sensor 22, therefore, the multiple sensor chips are arrayed adjacently, and effectively form a line sensor for scanning one line in the main scanning direction.

The first light source 31 and second light source 32 each have a lamp that emits light to a scanning area (exposure position) in the conveyance path of the moving document. When a document is scanned as a stationary document, the exposure position moves in the sub-scanning direction. Light reflected from the object (a document or white calibration plate, for example) located at the exposure position is received by the sensor chips of the first sensor 21 or second sensor 22, and the sensor chips generate signals corresponding to the amount of light received by each photoelectric conversion element.

The first sensor 21 and second sensor 22 have an analog front end, not shown. The analog front end includes a circuit that applies gain to the signals output by the photoelectric conversion elements according to the amount of light received, and an analog/digital conversion (ADC) circuit. The analog front end in this example also has a recording medium for recording information indicating the gain, and the analog front end, based on the gain information, adjusts the gain of the black level of the first sensor 21 and second sensor 22 to the lowest output value, and the white level to the highest output level.

Note that in this embodiment the first light source 31 and second light source 32 are light sources that output white light. Because the photoelectric conversion element arrays of the first sensor 21 and second sensor 22 are equipped with RGB color filters, the first sensor 21 and second sensor 22 can generate RGB scanning data based on the light from a document exposed to white light.

The conveyance device 40 is a mechanism that conveys documents. The conveyance device 40 conveys the moving document to the position exposed to light from the first light source 31, and the position exposed to light from the second light source 32, and then conveys the moving document out from the scanner 1.

Figure 2:
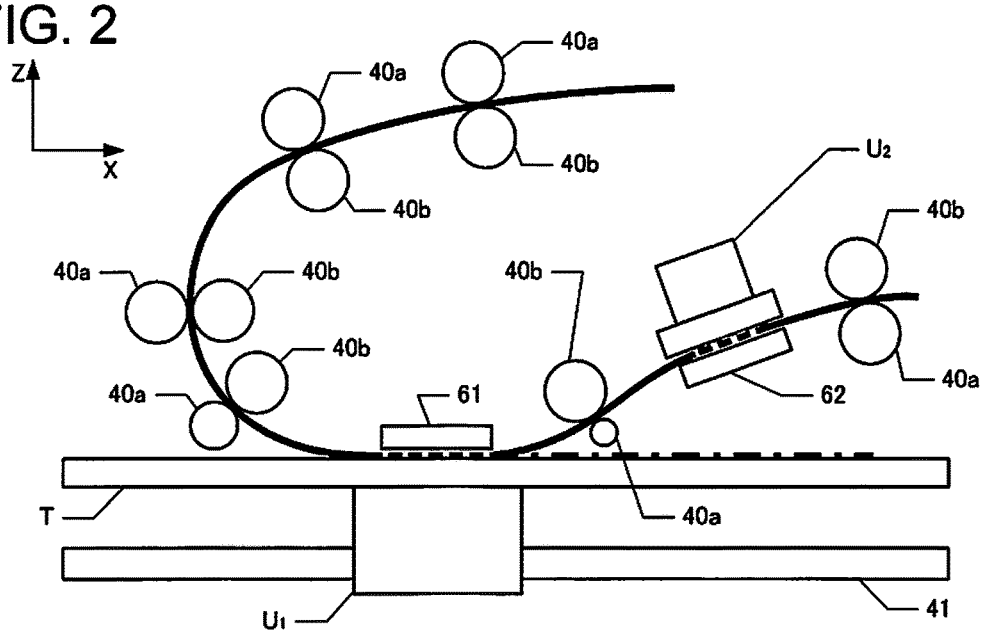
FIG. 2 illustrates the configuration around the conveyance mechanism of the scanner.

FIG. 2 schematically illustrates the conveyance path of the conveyance device 40. The conveyance path comprises plastic members not shown forming the path of the moving document, and a moving document is conveyed through the conveyance path by opposing conveyance rollers 40a, 40b disposed at multiple positions along the path. The conveyance path is indicated by the curve of the heavy solid line in FIG. 2. The exposure positions on the conveyance path are indicated by the dotted lines, and one line in the main scanning direction (direction perpendicular to the X-axis and Z-axis) is read at the exposure position by the first sensor 21 and second sensor 22.

FIG. 2 schematically illustrates the conveyance path of the conveyance device 40. The conveyance path comprises plastic members not shown forming the path of the moving document, and a moving document is conveyed through the conveyance path by opposing conveyance rollers 40a, 40b disposed at multiple positions along the path. The conveyance path is indicated by the curve of the heavy solid line in FIG. 2. The exposure positions on the conveyance path are indicated by the dotted lines, and one line in the main scanning direction (direction perpendicular to the X-axis and Z-axis) is read at the exposure position by the first sensor 21 and second sensor 22.

Light from the area of one line on a document is therefore split into light from multiple areas of which the ends in the main scanning direction overlap, and each of the split light beams is focused on a sensor chip. As a result, in this embodiment of the invention, the output from the sensor chips of the first sensor 21 must be synthesized to generate one line of scanning data. A merging mark used as an index for synthesizing data is therefore formed on the calibration plate 61 in this embodiment of the invention.

The merging mark is formed at a position where areas overlap at the ends of adjacent areas, and by scanning the merging mark when a document is not on the platen, the photoelectric conversion elements that read the same position can be identified in the output of the sensor chips.

The calibration plate 61 includes a white calibration plate and a black calibration plate for gain adjustment, the white level is determined based on the result measured with the white calibration plate, and the black level is determined based on the result measured with the black calibration plate. Note that the calibration plate 61 may be configured with a moving part, and disposed so that the target selected from among the merging mark, white calibration plate, and black calibration plate is moved by the moving part and set to the exposure position.

Like calibration plate 61, calibration plate 62 also has a white calibration plate and a black calibration plate.

In FIG. 2, the sub-scanning device 41 is a device capable of moving the first unit U1 bidirectionally in the sub-scanning direction (X-axis). When scanning a moving document, the sub-scanning device 41 sets the first unit U1 to a defined position as shown in FIG. 2. The document is then scanned with the first unit U1 at this specific position.

When scanning a stationary document set on the scanning platen T (that is, when scanning on a flat bed), the sub-scanning device 41 moves the first sensor 21, first light source 31, and first optical system 51 in the sub-scanning direction to scan the document. In the case of a stationary document, therefore, the area indicated in FIG. 2 by the dotted line and the dot-dash line connected to the dotted line is the exposure position (the document scanning range), and the exposure position can move in the sub-scanning direction.

The second sensor 22, second light source 32, and second optical system 52 of the second reading unit are disposed in the second unit U2 shown in FIG. 2. When scanning a moving document, one side (the front) is read by the first unit U1, and the other side (the back) is read by the second unit U2 when necessary. In this embodiment of the invention, the second reading unit (second unit U2) is a CIS (contact image sensor).

The first optical system 51 includes an optical member for reducing and converging an image of the document on the first sensor 21. More specifically, the first optical system 51 has a member forming an optical path guiding, to the sensor chip, light from the document produced by the first light source 31 emitting light to the document. The optical path may be configured in many ways, and can be configured from combinations of various members, including an aperture member, lenses, and mirrors.

Figure 3:
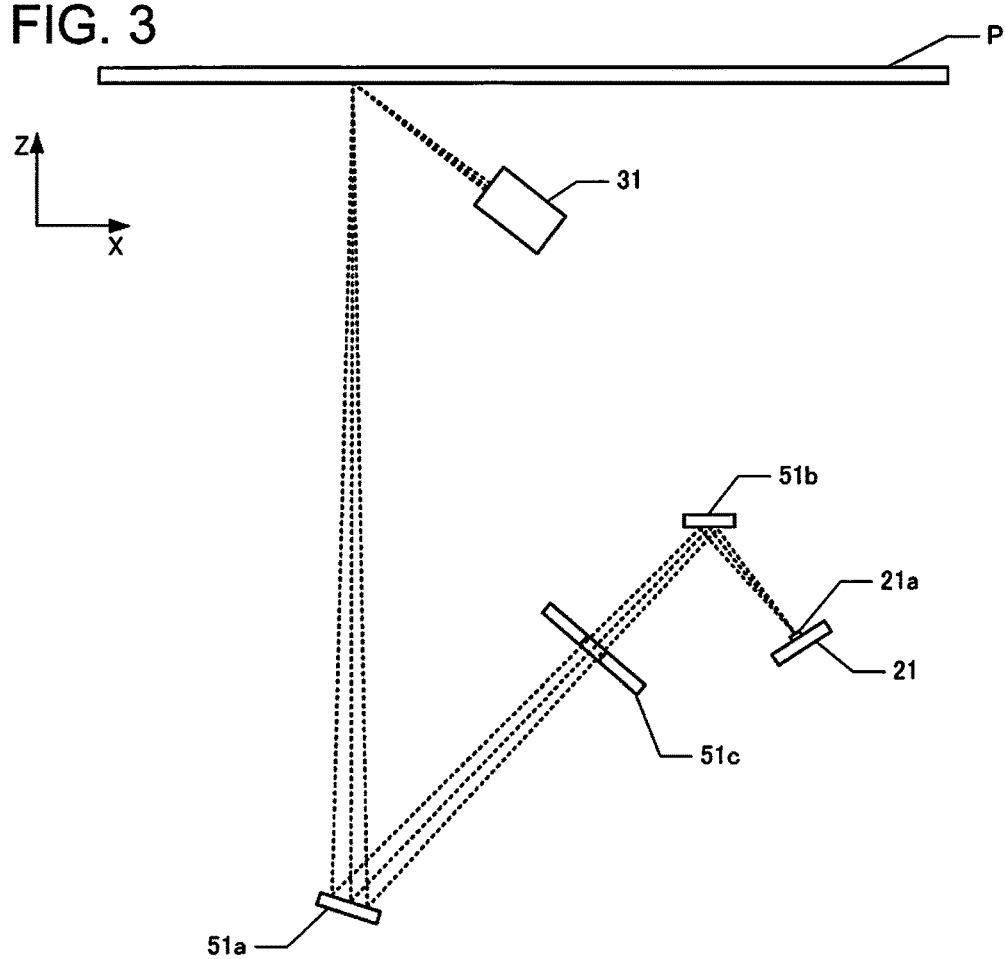
FIG. 3 illustrates the configuration of an optical system of the scanner.

FIG. 3 shows an example of an optical path as viewed parallel to the main scanning direction. The configuration in FIG. 3 shows the first light source 31 that emits light to the document P, first optical system 51, and first sensor 21. The first optical system 51 uses a configuration that includes a first mirror 51*a* with multiple concavities, a second mirror 51*b* with multiple concavities, and an aperture member 51*c* having multiple openings that function as apertures; and guides the light to the sensor chip 21*a* by splitting the light from one line in the main scanning direction of the document P (the direction perpendicular to the X-axis and Z-axis) into multiple areas that overlap in part in the main scanning direction, and reducing the image of each area.

Figure 4:
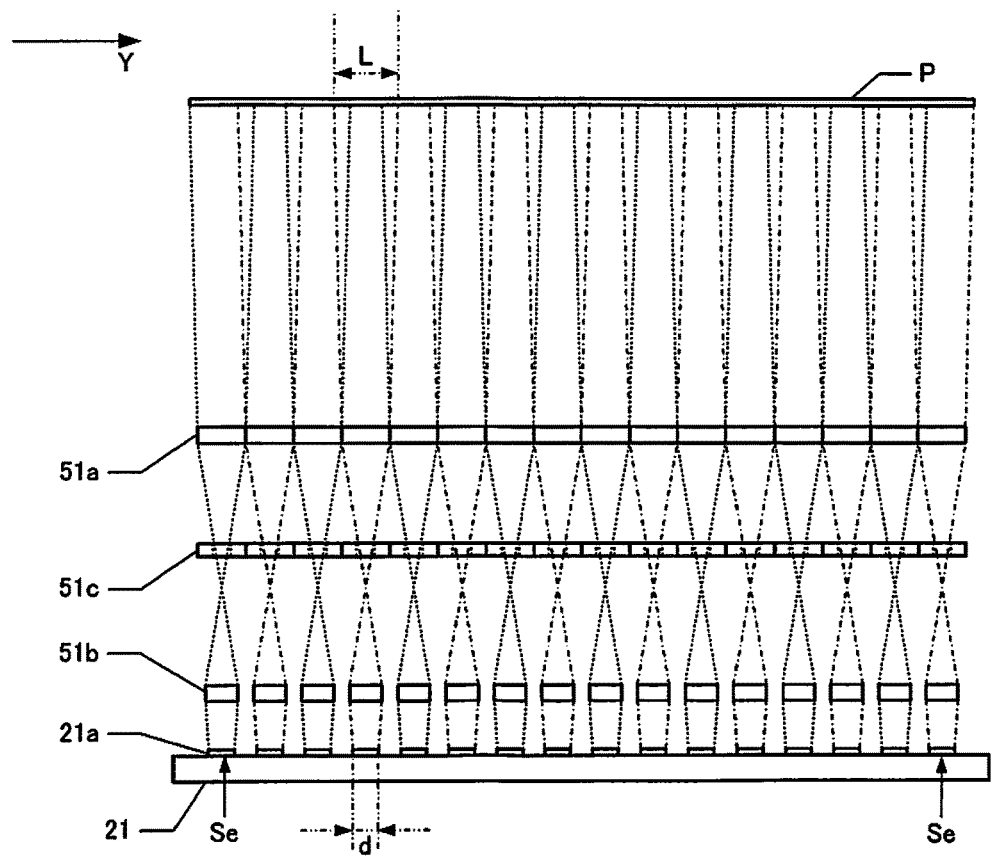
FIG. 4 schematically illustrates image reduction by the optical system.

FIG. 4 schematically illustrates the operation of the optical system with the main scanning direction on the horizontal axis. In FIG. 4, light from the document P passes the first optical system 51 and is guided to the sensor chip 21*a*, and the path of light from the document P is indicated schematically by the dotted lines and dot-dash lines. In other words, the sensor chip 21*a* extends in the main scanning direction (Y-axis), and images of adjacent parts of the document P that partially overlap in the main scanning direction are reduced in the parts of the first optical system 51 corresponding to those parts of the document P. The images from each area of the document P are then focused on the sensor chip 21*a* corresponding to those parts. More specifically, an image of the area of length L in the main scanning direction is focused on a sensor chip 21*a* of length d.

That one-to-one imaging optics that form images on the second sensor 22 without reducing the size are used in the second optical system 52. The controller 10 therefore does not need to apply the synthesizing process to the output of the second sensor 22, and applies another imaging process (such as cropping or edge enhancement) to acquire the scanning data.

However, because the first sensor reads same positions on the document P multiple times, the controller 10 must synthesize data output from adjacent sensor chips where the outputs coincide to generate the scanning data. More specifically, the controller 10, based on the read results of the merging mark formed on the calibration plate 61, superimposes the outputs of the sensor chips 21*a*. More specifically, as shown in FIG. 4, the first sensor 21 is embodied by multiple sensor chips 21*a*, and the multiple sensor chips 21*a* are disposed to different positions.

Figure 5:
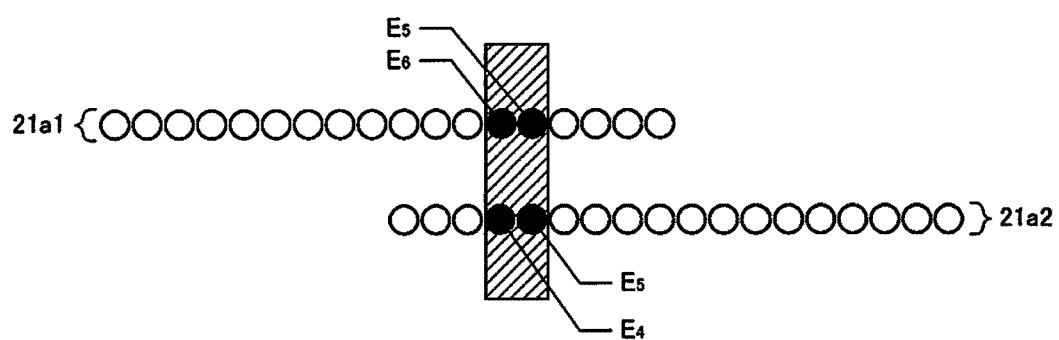
FIG. 5 describes data synthesis.

When the same positions are read by different sensor chips 21*a*, the same positions are read at the ends of the sensor chips 21*a*. Because these same positions are where the merging marks are disposed on the calibration plate 61, when the merging mark is read without a document present, each sensor chip 21*a* outputs data capturing the merging mark. FIG. 5

FIG. 5 schematically illustrates the photoelectric conversion elements of the sensor chip 21*a*, the black dots denoting the photoelectric conversion elements. In FIG. 5, the merging mark is a line extending in the sub-scanning direction, and the areas around the merging mark are white.

The merging mark is read by each pair of adjacent sensor chips 21*a*. In FIG. 5, the photoelectric conversion elements of the sensor chips 21*a* that read the merging mark are indicated by black dots, the merging mark is indicated by hatching, and the photoelectric conversion elements that read the merging mark are shown overlapping. One of the adjacent sensor chips 21*a* is located on the top left side, the other is located on the bottom right side, and the sensor chips 21*a* are shown schematically so that the photoelectric conversion elements that read the merging mark are vertically aligned. One of the two adjacent sensor chips 21*a* is referred to below as first sensor chip 21*a*1, and the other as second sensor chip 21*a*2.

The first sensor chip 21*a*1 and second sensor chip 21*a*2 output, as serial data, signals corresponding to the amount of light detected by the photoelectric conversion elements aligned in the main scanning direction. In this example, the controller 10 analyzes the output of the first sensor chip 21*a*1, and determines that the merging mark was detected by the fifth and sixth photoelectric conversion elements E5, E6 from the end. The controller 10 also analyzes the output of the second sensor chip 21*a*2, and determines that the merging mark was detected by the fourth and fifth photoelectric conversion elements E4, E5 from the end. In this case, the controller 10 determines that the fifth and sixth photoelectric conversion elements E5, E6 of the first sensor chip 21a1, and the fourth and fifth photoelectric conversion elements E4, E5 of the second sensor chip 21a2, read the same position, and in memory not shown stores the locations of the corresponding elements in each sensor chip 21a.

The controller 10 applies the above process sequentially from the end of the sensor chips 21a in the main scanning direction, and identifies the location of the photoelectric conversion elements that read the same position in each sensor chip 21a. Note that of the multiple sensor chips 21a embodying the first sensor 21, any of the sensor chips other than the sensor chips at the ends may be either a first sensor chip 21a1 or a second sensor chip 21a2.

For example, if one sensor chip 21a is the first sensor chip 21a1 and then becomes the adjacent second sensor chip 21a2 such that the second sensor chip 21a2 is treated as the first sensor chip 21a1, the sensor chip 21a adjacent thereto on the opposite side becomes the second sensor chip 21a2.

Once the locations of the photoelectric conversion elements reading the same position are determined as described above, the next time a document P is scanned, the controller 10 generates one line of scanning data by synthesizing the outputs of the sensor chips 21a based on their respective positions.

(2) Optical System Configuration

In the configuration described above, a segmented reduction optics system that reduces a document through multiple optical paths and focuses on multiple sensor chips 21a is used for the first reading unit, and the second reading unit is a CIS that scans a document using multiple sensor chips and a 1:1 (same size) imaging optical system. As a result, different optical systems are used in the first reading unit and the second reading unit.

Figure 6:
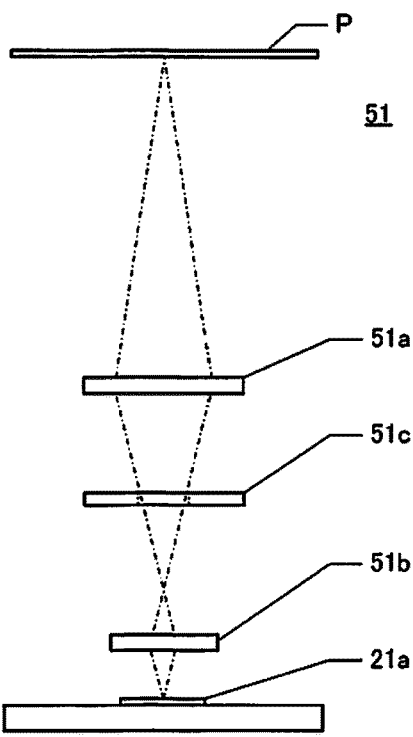
FIG. 6 illustrates the optical system of a first reading unit.

FIG. 6 illustrates the parts related to one optical path in the first optical system 51 of the first reading unit. As shown in FIG. 6, light from a document P passes the concavity of the first mirror 51a, through the aperture of the aperture member 51c, and is focused on the sensor chip 21a through the concavity of the second mirror 51b.

Figure 7:
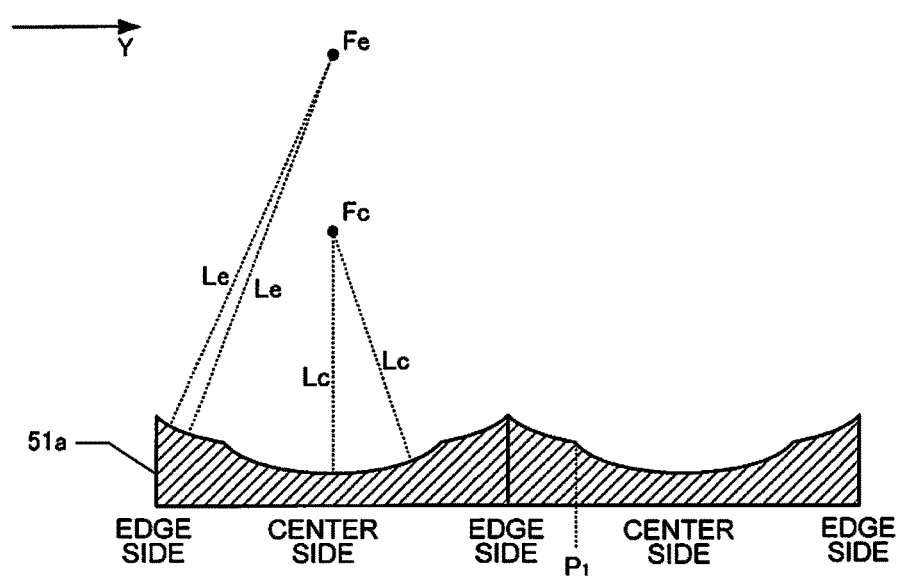
FIG. 7 schematically illustrates the shape of the concavities of the first mirror.

In this configuration, the optical characteristics of the concavity of the first mirror 51a differ according the position. FIG. 7 schematically illustrates the shape of the concavity of the first mirror 51a. FIG. 7 is a section view of the concavity on a plane through the focal points of the first mirror 51a, and shows the shape of two concavities in section. Note, however, that FIG. 7 exaggerates the differences in the shape (curvature) according to the position of the concavities. The actual differences in the shape due to the position of the concavities is extremely minute.

The concavities of the first mirror 51a in this embodiment have different optical characteristics at the edge sides and the center side of the concavities as shown in FIG. 7. More specifically, the optical characteristics in this embodiment can be expressed by the focal length, and the focal length at the edge side of the concavities is longer than the focal length in the center of the concavity. To better illustrate this difference, FIG. 7 exaggerates the difference between the edges and the center, and emphasizes the border between the edge area and the center. In practice, the change between the edge area and the center is less than shown in FIG. 7, and the boundary between the edge area and the center is smooth so that the image does not change suddenly at the boundary. The edge area and the center may transition smoothly overall.

Note that the edge and center sides of the concavity are defined as they relate to the main scanning direction when the part converging light on a single sensor chip 21a is treated as a single concave mirror. In other words, the area that reflects light converging in the center of the sensor chip 21a in the main scanning direction can be defined as the center side, and the area that reflects light converging at the edge of the sensor chip 21a in the main scanning direction can be defined as the edge side. In FIG. 7, the part at the bottom of the concavity is defined as the center side. Also in FIG. 7, the first mirror 51a is formed by joining multiple concave mirrors side by side in the main scanning direction, but the location of the boundary is not limited to the locations shown in the example in FIG. 7. For example, a configuration in which the mirrors are joined at position P1 in FIG. 7 is also conceivable. Even in this configuration, the locations of the center and edge sides are defined as shown in FIG. 7.

In FIG. 7, the focal point of the center side of the concavity is focal point Fc, and the focal point of the edge side of the concavity is focal point Fe. As shown in FIG. 7, in this example the focal length of the center side of the concavity is Lc, the focal length of the edge side of the concavity is Le, and focal length Le of the edge side of the concavity is longer than the focal length Lc of the center side of the concavity. As described above, the optical characteristics of the concavity of the first mirror 51a in this embodiment differ according to the position, and image quality is adjusted according to the position of the optical path.

In this embodiment of the invention, the optical characteristic that differs according to the position on the concavity of the first mirror 51a is the focal length, and the focal length at the edge side of the concavity is longer than the focal length at the center side of the concavity. A drop in image quality due to separation of the document from the platen glass at the edge side of the concavity can be suppressed better than a drop in image quality at the center side of the concavity. Note that the curvature of the concavity at the edge side does not need to be the same as the curvature of the concavity at the center side. For example, a configuration that gradually changes the curvature from the center side to the edge side may be used.

(2-1) Spatial Frequency Characteristics

As described above, the optical characteristics of the first mirror 51a in this embodiment differ according to the position, but the optical characteristic may refer to various properties other than the focal length. For example, the spatial frequency characteristic may be used as the optical characteristic. More specifically, when the spatial frequency of light reflected from a concavity and picked up by the eye or a sensor varies according to the position on the concavity, the optical characteristics may be said to differ according to the position on the concavity. In this way, a configuration in which the spatial frequency varies according to the position on the concavity can also be seen as a configuration enabling adjusting the image quality according to the position of the concavity.

Figure 8:
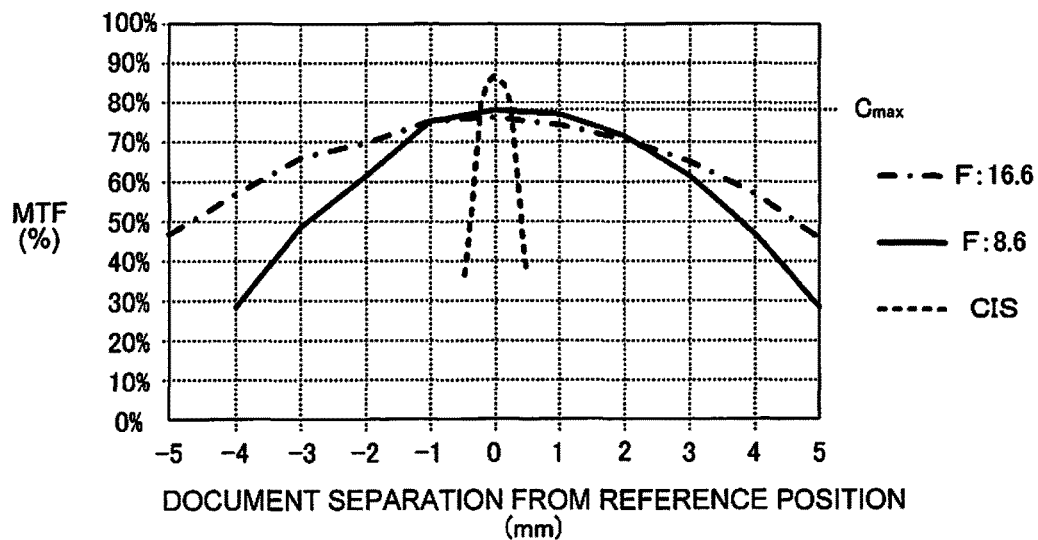
FIG. 8 is a graph showing the simulated results of the spatial frequency characteristic near the center of the concavity.
Figure 9:
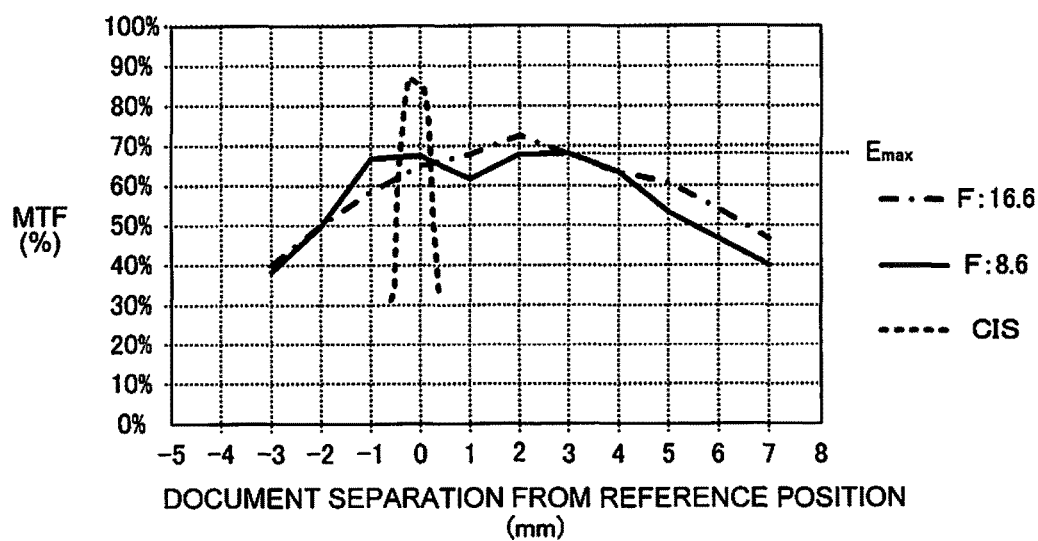
FIG. 9 is a graph showing the simulated results of the spatial frequency characteristic near the edges of the concavity.

FIG. 8 and FIG. 9 show the results of simulations of the spatial frequency characteristics acquired by scanning a document with the first reading unit. The path of light from a document P was simulated based on the shape and size of the actual members of a first optical system 51 configured as shown in FIG. 6, and a process acquiring the spatial frequency characteristics with varying amounts of separation of the document P from the platen glass (reference position) was executed. The graphs shown in FIG. 8 and FIG. 9 were then created based on the spatial frequency characteristics (MTF: Modulation Transfer Function) acquired at the different amounts of separation.

Note that FIG. 8 shows the spatial frequency at the center side of the concavity, and FIG. 9 shows the spatial frequency at the edge side of the concavity. Both graphs show the results of simulations where the equivalent f-number of the first optical system 51 is 8.6 and 16.6, the solid line based on data for an equivalent f-number of 8.6, and the dotted line based on data for an equivalent f-number of 16.6. The equivalent f-number is the value acquired by simulating the f-number supposing a lens forming an optical path equivalent to the optical path formed by the optical system. In FIG. 8, document separation ranged from −5 mm to 5 mm (a negative value was included for simulation), and in FIG. 9 document separation ranged from −5 mm to 8 mm.

FIG. 8 and FIG. 9 also show the spatial frequency of a CIS (such as the second reading unit) with a typical f-number of approximately 2 to 3. Compared with a CIS, the width of the spatial frequency distribution with the first reading unit using the first optical system 51 is greater, and the spatial frequency characteristic exceeds 50% over a wide range. Therefore, the first reading unit can suppress a drop in image quality due to separation of the document from the platen glass better than the second reading unit.

Note that because barcodes and QR codes (R) can be read if the spatial frequency characteristic exceeds 50%, tolerance for separation of the document from the reference position is poor at less than 1 mm with a CIS, but such symbols can be read by the first optical system 51 even if the document separates several millimeters from the reference position.

In addition, as shown in FIG. 8, distribution of the spatial frequency characteristic in the center side of the concavity is substantially left-right symmetrical to the center at a document separation of 0 mm.

As shown in FIG. 9, however, the center of the distribution of the spatial frequency characteristic at the edge side of the concavity is at a document separation of approximately 1 to 2 mm, and is shifted to the document separation side from 0 mm of document separation. More specifically, the distribution of the spatial frequency characteristic at the edge side of the concavity shifts to the document separation side from the distribution of the spatial frequency characteristic at the center side of the concavity. As a result, even if there is greater document separation at the edge side of the concavity than at the center, a drop in image quality due to separation of the document from the reference position can be suppressed.

The maximum of the spatial frequency characteristic at the edge side of the concavity is less than the maximum of the spatial frequency characteristic at the center side of the concavity. For example, at equivalent f-number 8.6, the maximum of the spatial frequency characteristic at the edge side of the concavity is Cmax as shown in FIG. 8, and the maximum of the spatial frequency characteristic at the center side of the concavity is Emax as shown in FIG. 9.

Because Cmax>Emax as will be understood from FIG. 8 and FIG. 9, the maximum of the spatial frequency characteristic at the edge side of the concavity is less than the maximum of the spatial frequency characteristic at the center side of the concavity. Therefore, is reducing the maximum of the spatial frequency characteristic is allowed, a relatively greater spatial frequency characteristic can be achieved in the center side of the concavity than at the edge side of the concavity, and a drop in image quality due to document separation can be effectively suppressed at the edge side of the concavity.

(3) Scanning Process

The scanning process in this embodiment of the invention is described next with reference to the flow chart in FIG. 10.

Figure 10:
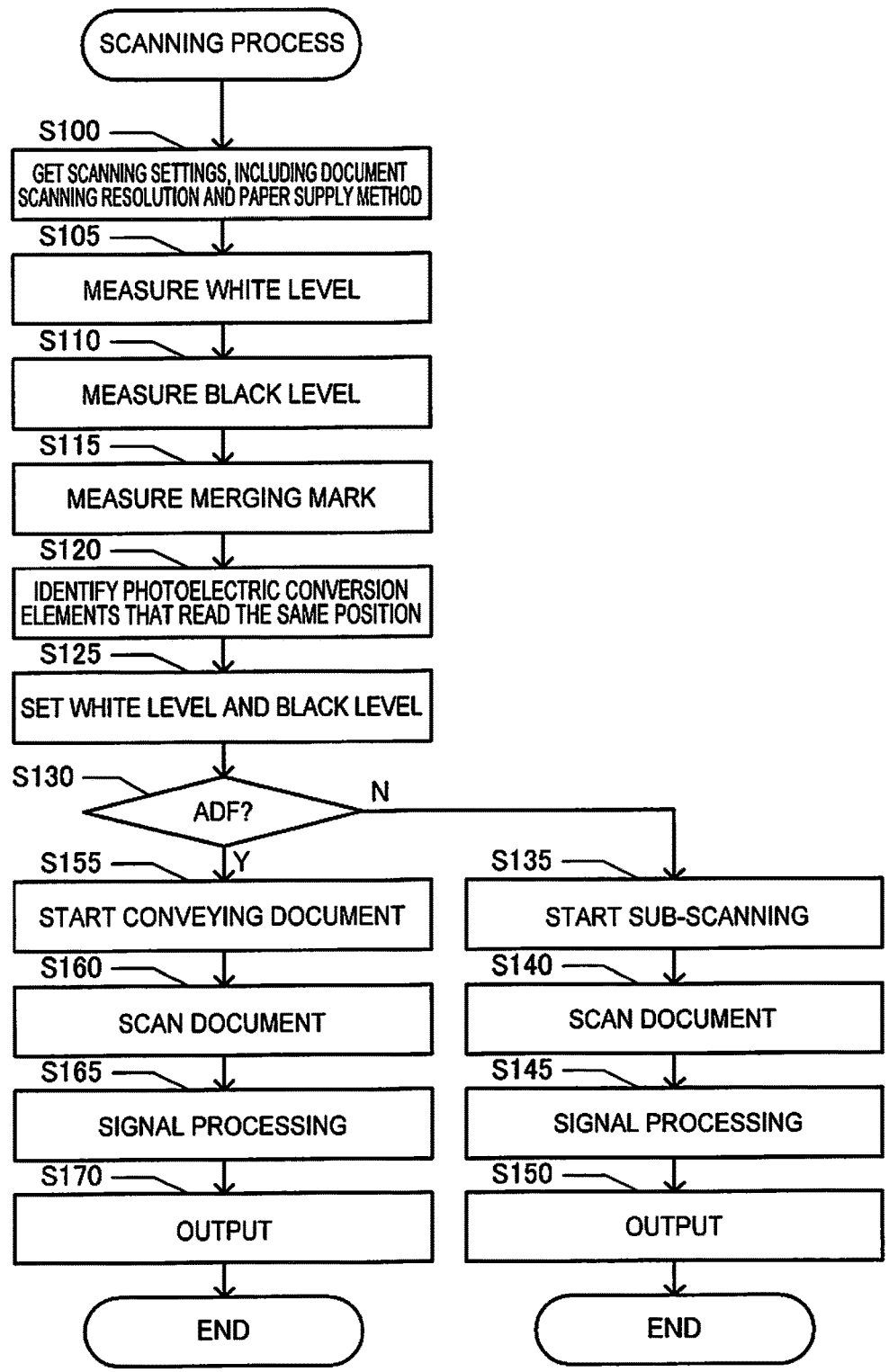
FIG. 10 is a flow chart of the scanning process.

When the user directly or indirectly selects the document scanning resolution and paper feed method (ADF or document platen), and commands scanning to start, the controller 10 receives the scan command and starts the scanning process shown in FIG. 10. When the scanning process starts, the controller 10 gets the scanning settings, including the document scanning resolution and the paper feed method (step S100). Note that in this example the user can select and set the desired resolution from among the plural document scanning resolutions that can be set for reading light reflected from a moving document.

Next, the controller 10 measures image shading. More specifically, the lowest level of light detectable by the sensor chip is the black level, and the highest level of detectable light is the white level, but the black level and white level can vary according to the sensor, light source, and other characteristics. For example, sensor characteristics may vary due to noise such as dark current, sensor manufacturing errors, and aging, and the black level and white level can vary according to such variations. Therefore, to scan with high quality, imaging shading is preferably measured before reading a document to determine at least one of the black level and white level.

The controller 10 in this example first measures the white level (step S105). More specifically, before reading the document, the controller 10 controls the first reading unit (and the second reading unit if scanning both sides) to read the white calibration plate of the calibration plate 61. As a result, because output indicating the measurement acquired by the first sensor 21 (and the second sensor 22 if scanning both sides) from the white calibration plate is acquired, the controller 10 acquires the output as the white level.

Next, the controller 10 measures the black level (step S110). More specifically, before reading the document, the controller 10 controls the first reading unit (and the second reading unit if scanning both sides) to read the black calibration plate of the calibration plate 61. As a result, because output indicating the measurement acquired by the first sensor 21 (and the second sensor 22 if scanning both sides) from the black calibration plate is acquired, the controller 10 acquires the output as the black level.

Next, the controller 10 measures the merging mark (step S115). More specifically, before scanning the document, the controller 10 controls the first reading unit to scan the merging mark of the calibration plate 61. As a result, the results of scanning the merging mark are output from the multiple sensor chips of the first sensor 21. Note that because there is no need to synthesize the output of the second sensor 22 in this embodiment, the merging mark is not scanned by the second sensor 22.

Next, the controller 10 identifies the photoelectric conversion elements that read the same position (step S120). For example, using the example in FIG. 5, the controller 10 identifies photoelectric conversion elements E5, E6 of the first sensor chip 21*a*1, and photoelectric conversion elements E4, E5 of second sensor chip 21*a*2, as the photoelectric conversion elements that read the same position. The controller 10 executes the same process for each sensor chip 21a, and identifies the photoelectric conversion elements in each sensor chip that read the same position.

Next, the controller 10 sets the black level and white level (step S125). That is, the controller 10, based on the white level measured in step S105 and black level measured in step S110, sets the white level and black level for each photoelectric conversion element. More specifically, based on the white level measured in step S105 and black level measured in step S110, the control unit 13 sets the gain to enable measuring gradations between the white level and black level in the effective detection range.

Next, the controller 10 determines if the paper supply method is by ADF or not (step S130). More specifically, the controller 10 references the scanning settings acquired in step S100 to determine if the paper supply method is by ADF or using the scanning platen. If the controller 10 determines in step S130 that the paper supply method is not by ADF, that is, that a document on the document platen is to be scanned, the controller 10 starts sub-scanning (step S135). More specifically, the controller 10 outputs a control signal to the sub-scanning device 41 to move the first sensor 21, first light source 31, and first optical system 51 in the sub-scanning direction.

The controller 10 reads the document during the sub-scanning operation (step S140). More specifically, the controller 10 controls the first sensor 21 to read, and acquires the read results from the sensor chips 21a of the first sensor 21.

Next, the controller 10 synthesizes the output from the sensor chips 21a (step S145). More specifically, the controller 10 digitizes the output of the sensor chips 21a, adjusts the gain according to the white level and black level set in step S125, executes a synthesizing process causing the photoelectric conversion elements identified in step S120 to output one pixel, converts value and color, crops the document, applies edge enhancement, and executes other signal processing operations. These processes may be applied sequentially to the line by line results read in step S140, or in a batch after all read results are acquired.

Next, the controller 10 outputs the scanning data (step S150). More specifically, when one page of data synthesized in step S145 is accumulated, the controller 10 image processes the data for image cropping and edge enhancement, for example, generates scanning data for the one page, and outputs the scanning data through the communicator 70 to the computer 90.

If the controller 10 determines in step S130 that the paper supply method is by ADF, the controller 10 starts conveying the document (step S155). More specifically, the controller 10 outputs a control signal to the sub-scanning device 41 to move the first reading unit to a specific scanning position. The controller 10 then outputs a control signal to the conveyance device 40 to convey the document through the conveyance path.

While the document is being conveyed, the controller 10 reads the document (step S160). More specifically, the controller 10 controls the first sensor 21 to read, and acquires the read results from the sensor chips 21a of the first sensor 21. Note that if duplex scanning is selected in step S100, the controller 10 also controls the second sensor 22 to read, and acquires the read results from the second sensor 22.

Next, the controller 10 signal processes the output (step S165). More specifically, the controller 10 digitizes the output of the sensor chips 21a (including the output from the second sensor 22 if duplex scanning is selected), adjusts the gain according to the white level and black level set in step S125, executes a synthesizing process causing the photoelectric conversion elements identified in step S120 to output one pixel, converts value and color, crops the document, applies edge enhancement, and executes other signal processing operations. These processes may be applied sequentially to the line by line results read in step S160, or in a batch after all read results are acquired. Note that because there is no need to synthesize the read results from the second sensor 22, the read results from the second sensor 22 are not subject to the synthesis process.

Next, the controller 10 outputs the scanning data (step S170). More specifically, when one page of data synthesized in step S165 is accumulated, the controller 10 applies image processing including cropping and edge enhancement, for example, generates scanning data for the one page, and outputs the scanning data through the communicator 70 to the computer 90. If duplex scanning was selected, the controller 10 generates the scanning data using the one page of data synthesized in step S165 and the one page of data read from the back in step S160, and then outputs to the computer 90.

(4) Other Embodiments

The invention is described with reference to desirable embodiments above, but the invention is not so limited and can be varied in many ways. For example, the scanner described above may be a component of a multifunction device, which is an electronic device that is also used for other purposes.

The merging mark may also be configured in many ways, and may be two lines or graphic of another shape. During synthesis, images may also be synthesized to eliminate deviation (such as skewing) of the sensor chips in the sub-scanning direction.

To superimpose the outputs of photoelectric conversion elements that read the same part of the document, a statistical value (such as the average) of scanning data from one sensor chip and scanning data from the other sensor chip may be acquired and used, or the scanning data from one of the sensor chips may be used.

Scanning data generated by scanning may be output to a computer 90, output and stored to a storage medium such as USB memory installed to the device, output to a print mechanism and printed (or copied), or output and displayed on a monitor.

Alternatively, the final scanning data may be generated by outputting an area detection image to a computer 90, and applying image analysis and synthesis by a driver program or application program of the computer 90. In this configuration, the computer 90 may be considered part of the scanner.

The first mirror may have multiple concavities reflecting light from the document. More specifically, the first mirror may be configured as needed to form an optical path to the sensor group by changing the direction of travel of light from a document by reflection. The light from a document may be any light output from the document as a result of exposing the document to light from a light source, and in many configurations is reflected light, but may be fluorescent light, for example.

The first mirror has multiple concavities. More specifically, different optical paths can be formed by the concavities, and light from a document can be guided through multiple optical paths to multiple positions (such as multiple sensor chips) corresponding to the respective optical paths.

In addition, the concavities may be configured as surfaces that reflect and converge parallel incident light on a focal point, and may be surfaces configured as an optical system (such as a reduction optical system that reduces the size of the image) that changes the size of the image corresponding to the light from a document.

The number of concavities is not limited insofar as the configuration at least guides light from multiple areas in the main scanning direction to multiple positions. For example, a configuration that is a number corresponding to the number of sensor chips in a sensor can be used.

In addition, multiple mirrors may be disposed to the same optical path. For example, a configuration that converges light through two reflections by two concavities may be used. The focal length and curvature of a concavity is not specifically limited, and may be changed according to the size of the scanner or the configuration of the optical system, for example.

The sensor may be configured in any form enabling sensing light reflected by a concavity. Photoelectric conversion elements used for detection may be configured as a sensor chip. There may be one or multiple sensor chips.

Note that the sensor chip has photoelectric conversion elements arranged at least in the main scanning direction, and may also have photoelectric conversion elements at multiple positions in the sub-scanning direction. In the latter case, photoelectric conversion elements may be at multiple positions in the sub-scanning direction in the sensor chip, or by arraying sensor chips in the sub-scanning direction, photoelectric conversion elements may be disposed at multiple positions in the sub-scanning direction.

Note that in a configuration in which photoelectric conversion elements are at multiple positions in the sub-scanning direction, the photoelectric conversion elements at multiple positions in the sub-scanning direction may be used to form images of different colors, or be used to form an image of one line in the main scanning direction by combining their outputs.

The optical characteristic of the concavity may be any characteristic that affects the imaging result of the sensor, and may be a property other than the spatial frequency characteristic or focal length. For example, optical characteristics may change according to the curvature and material of the concavity, and the type of surface (such as a paraboloid or free-form surface). The optical characteristic differs according to the position of the concavity, and may change in steps according to the position, or change continuously.

Furthermore, an example in which the optical axis is straight is described above for simplicity, but by adding mirrors to the first optical system and the second optical system to fold the optical path appropriately, the overall size of the optical system may be reduced.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A scanner comprising:
a first mirror having a plurality of concavities configured to reflect light from a document; and
a sensor configured to detect the light reflected by the concavities, wherein
an optical characteristic of the light reflected by the concavities differs according to positions at which the light is reflected on the concavities of the first mirror, and
a spatial frequency characteristic of the light reflected by the concavities differs according to positions at which the light is reflected on the concavities of the first mirror.

2. The scanner described in claim 1, wherein:
a distribution of the spatial frequency characteristic on an edge side of the concavities shifts to a document separation side more than a distribution of the spatial frequency characteristic on a center side of the concavities.

3. The scanner described in claim 1, wherein:
a maximum of the spatial frequency characteristic on an edge side of the concavities is less than a maximum of the spatial frequency characteristic on a center side of the concavities.

4. A scanner comprising:
a first mirror having a plurality of concavities configured to reflect light from a document; and
a sensor configured to detect the light reflected by the concavities, wherein
an optical characteristic of the light reflected by the concavities differs according to positions at which the light is reflected on the concavities of the first mirror, and
a focal length of the light reflected by the concavities differs according to positions at which the light is reflected on the concavities of the first mirror.

5. The scanner described in claim 4, wherein:
the focal length at an edge side of the concavities is longer than the focal length at a center side of the concavities.

6. A method of generating scanning data using a sensor configured to reflect light from a document by a first mirror having a plurality of concavities, and detect the light reflected by the concavities, comprising:
detecting the light which is reflected by the concavities and whose optical characteristic, spatial frequency characteristic or focal length differs according to positions at which the light is reflected on the concavities of the first mirror, and generating scanning data by the sensor.

\* \* \* \* \*

UNITED STATES PATENT AND TRADEMARK OFFICE
CERTIFICATE OF CORRECTION

PATENT NO. : 10,477,057 B2
APPLICATION NO. : 15/976941
DATED : November 12, 2019
INVENTOR(S) : Takahiro Netsu It is certified that error appears in the above-identified patent and that said Letters Patent is hereby corrected as shown below:

On the Title Page

Please change the Assignee [73] from:
[73] Assignee: Seiko Corporation, Tokyo (JP)

To:
-- [73] Assignee: Seiko Epson Corporation, Tokyo (JP) --

Signed and Sealed this
Thirty-first Day of December, 2019

Andrei Iancu
*Director of the United States Patent and Trademark Office*